(12) United States Patent
Yang (10) Patent No.: US 8,587,266 B2
(45) Date of Patent: Nov. 19, 2013

(54) SYNCHRONOUS REGULATION CIRCUIT FOR TURN-ON AND TURN-OFF PHASE ANGLE OF THE AC VOLTAGE

(76) Inventor: Tai-Her Yang, Dzan-Hwa (TW)

( * ) Notice: Subject to any disclaimer, the term of this patent is extended or adjusted under 35 U.S.C. 154(b) by 228 days.

(21) Appl. No.: 13/080,786

(22) Filed: Apr. 6, 2011

(65) Prior Publication Data
US 2012/0256603 A1    Oct. 11, 2012

(51) Int. Cl.
*G05F 1/00* (2006.01)
(52) U.S. Cl.
USPC ............................................. 323/244; 323/320
(58) Field of Classification Search
USPC ......... 323/237–241, 244, 320, 324, 325, 327; 363/148–156
See application file for complete search history.

(56) References Cited

U.S. PATENT DOCUMENTS

2009/0284182 A1* 11/2009 Cencur .......................... 315/307

* cited by examiner

*Primary Examiner* — Harry Behm
*Assistant Examiner* — Matthew Grubb
(74) *Attorney, Agent, or Firm* — Bacon & Thomas, PLLC (57) ABSTRACT

The present invention provides a synchronous regulation circuit for turn-on and turn-off phase angle of the AC voltage, wherein a solid switch unit is installed between an AC power source and a load, and a phase angle regulation circuit is utilized to synchronously regulate both of the turn-on phase angle and turn-off phase angle of the solid switch unit, so that the sine waveform voltage of the AC power source can be kept to output in symmetrical waveforms within the range in which the turn-on and turn-off phase angles being synchronously regulated.

15 Claims, 4 Drawing Sheets

SYNCHRONOUS REGULATION CIRCUIT FOR TURN-ON AND TURN-OFF PHASE ANGLE OF THE AC VOLTAGE

BACKGROUND OF THE INVENTION (1) Field of the Invention

The present invention relates to a synchronous regulation for the turn-on and turn-off phase angles of the sine waveform voltage output by an AC power source, which is a novel regulation mode capable of synchronously regulating the turn-on and turn-off phase angles that breaks through the conventional regulation mode of either regulating the trigger phase angle or regulating the turn-off phase angle, and especially provided with a feature of regulating both of the turn-on and turn-off phase angles with the same phase angle, so that the sine waveform voltage of the AC power source can be kept to output in symmetrical waveforms within the range in which the turn-on and turn-off phase angles being synchronously regulated; the synchronous regulation circuit for turn-on and turn-off phase angle of the AC voltage, provided by the present invention, can be applied to regulate the voltage output by a single-phase AC power source or a multiphase AC power source, for supplying power with stable voltage to a load, or for regulating the output current to the load.

(2) Description of the Prior Art

Figure 1:
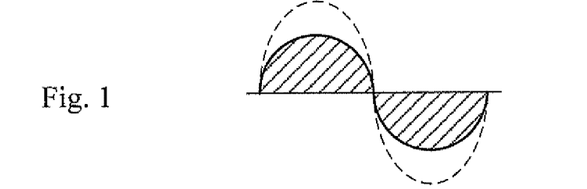
FIG. 1 is a schematic view showing the waveform of the conventional amplitude modulation type voltage regulation for the sine-waveform AC voltage.
Figure 2:
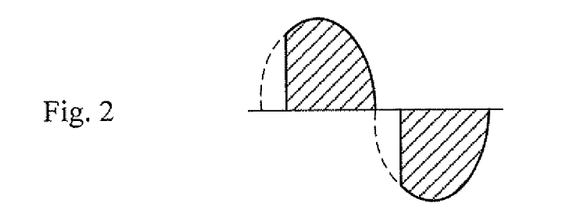
FIG. 2 is a schematic view showing the voltage regulation waveform of the conventional regulation for the turn-on phase angle of the sine-waveform AC voltage.
Figure 3:
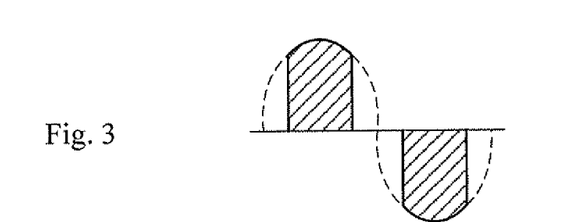
FIG. 3 is a schematic view showing the voltage regulation waveform of the conventional regulation for the turn-off phase angle of the sine-waveform AC voltage.

The conventional regulation method for an AC power source is amplitude modulation (as shown in FIG. 1), and till now, the control means for phase angle is to either regulate the trigger phase angle (as shown in FIG. 2), or regulate the turn-off phase angle (as shown in FIG. 3), thereby the application is limited.

SUMMARY OF THE INVENTION

The present invention provides a synchronous regulation circuit for turn-on and turn-off phase angle of the AC voltage, wherein a solid switch unit is installed between an AC power source and a load, and a phase angle regulation circuit is utilized to synchronously regulate both of the turn-on phase angle and turn-off phase angle of the solid switch unit, so that the sine waveform voltage of the AC power source can be kept to output in symmetrical waveforms within the range in which the turn-on and turn-off phase angles being synchronously regulated; the synchronous regulation circuit for turn-on and turn-off phase angle of the AC voltage, provided by the present invention, can be applied to regulate the voltage output by a single-phase AC power source or a multiphase AC power source, for supplying power with stable voltage to a load or for regulating the output current to the load.

DESCRIPTION OF MAIN COMPONENT SYMBOLS (1000): Bipolar solid switch unit
(1001),(1002): Unipolar solid switch unit
(BR101),(BR102): Bridge rectifier
(CR101),(CR102): Diode
(L101): Load
(PD100): Regulation circuit of bipolar turn-on and turn-off phase angle
(PD200): Configuration circuit of bipolar turn-on and turn-off phase angle
(PD101),(PD102): Regulation circuit of unipolar turn-on and turn-off phase angle
(PD103),(PD104): Configuration circuit of unipolar turn-on and turn-off phase angle
(Z10): AC current limiting circuit device
(ZD101),(ZD102),(ZD103),(ZD104): Zener diode

DETAILED DESCRIPTION OF THE PREFERRED EMBODIMENTS

The conventional regulation method for an AC power source is amplitude modulation (as shown in FIG. 1), and till now, the control means for phase angle is to either regulate the trigger phase angle (as shown in FIG. 2), or regulate the turn-off phase angle (as shown in FIG. 3), thereby the application is limited.

The present invention relates to a synchronous regulation for the turn-on and turn-off phase angles of the sine waveform voltage output by an AC power source, which is a novel regulation mode capable of synchronously regulating the turn-on and turn-off phase angles that breaks through the conventional regulation mode of either regulating the trigger phase angle or regulating the turn-off phase angle, and especially provided with a feature of regulating both of the turn-on and turn-off phase angles with the same phase angle, so that the sine-waveform voltage of the AC power source can be kept to output in symmetrical waveforms within the range in which the turn-on and turn-off phase angles being synchronously regulated; the synchronous regulation circuit for turn-on and turn-off phase angle of the AC voltage, provided by the present invention, can be applied to regulate the voltage output by a single-phase AC power source or a multiphase AC power source, for supplying power with stable voltage to a load, or for regulating the output current to the load.

The present invention provides a synchronous regulation circuit for turn-on and turn-off phase angle of the AC voltage, wherein a solid switch unit is installed between an AC power source and a load, and a phase angle regulation circuit is utilized to synchronously regulate both of the turn-on phase angle and turn-off phase angle of the solid switch unit, so that the sine-waveform voltage of the AC power source can be kept to output in symmetrical waveforms within the range in which the turn-on and turn-off phase angles being synchronously regulated; the synchronous regulation circuit for turn-on and turn-off phase angle of the AC voltage, provided by the present invention, can be applied to regulate the voltage output by a single-phase AC power source or a multiphase AC power source, for supplying power with stable voltage to a load or for regulating the output current to the load.

Figure 4:
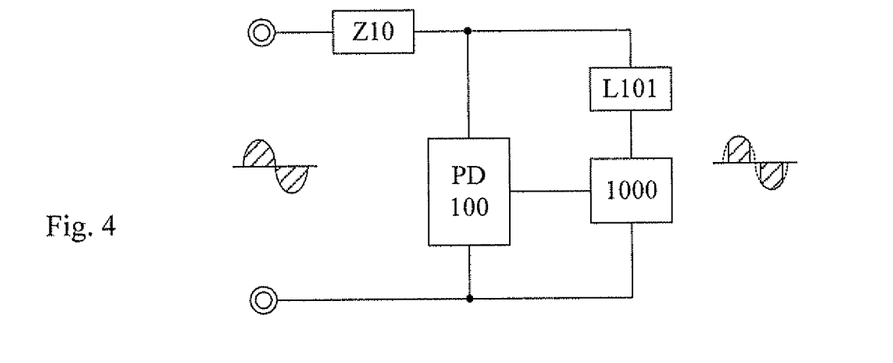
FIG. 4 is a circuit block diagram showing utilizing the bipolar solid switch unit for structuring the synchronous regulation for turn-on and turn-off phase angles of the AC voltage, according to the present invention.

FIG. 4 is a circuit block diagram showing utilizing the bipolar solid switch unit for structuring the synchronous regulation for turn-on and turn-off phase angles of the AC voltage, according to the present invention.

As shown in FIG. 4, it mainly consists of:

AC current limiting circuit device (Z10): which is constituted by one or more than one of resistive impedance, inductive impedance and capacitive impedance being connected in series, in parallel or in series and parallel and provided for being connected in series with the load (L101) and the bipolar solid switch unit (1000) then connected in parallel with the AC power source;

Bipolar solid switch unit (1000): which is constituted by one or more than one of following solid switch units:

1) The bipolar solid switch unit (1000) is composed of a bidirectional thyristor component capable of controlling the turn-on phase angle, e.g. bidirectional silicon controlled rectifier TRIAC (Triode AC semiconductor switch); through the regulation function of the regulation circuit of bipolar turn-on and turn-off phase angle (PD100) itself, a bipolar driving voltage signal is output to regulate the turn-on phase angle and the turn-off phase angle of the bipolar solid switch unit (1000) composed of the TRIAC;

2) The bipolar solid switch unit (1000) is composed of at least two field effect power components, e.g. a bipolar module composed of the metal oxide semiconductor field effect transistor (MOSFET) or the insulated gate bipolar transistor (IGBT); and through the regulation function of the regulation circuit of bipolar turn-on and turn-off phase angle (PD100) itself, a bipolar driving voltage signal is output to regulate the turn-on phase angle and the turn-off phase angle of the bipolar solid switch unit (1000) composed of at least two field effect power components;

Regulation circuit of bipolar turn-on and turn-off phase angle (PD 100): which is constituted by electronic circuit components for inputting the AC power voltage; and through the regulation function of the circuit itself, and with respect to the current value passing the AC current limiting circuit device (Z10) and the terminal voltage value of the load (L101), a bipolar driving voltage signal is output to regulate the turn-on phase angle and the turn-off phase angle of the bipolar solid switch unit (1000);

The mentioned circuit is for regulating the resistance, the inductive load containing the resistance or the capacitive load containing the resistance driven by the AC power, or the load in which the inductive load and the capacitive load containing the resistance connected in series.

Figure 5:
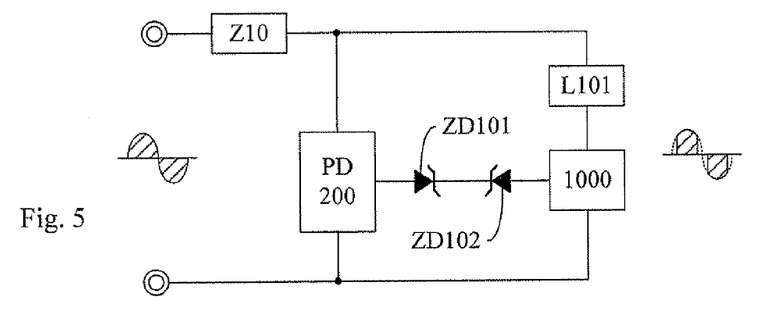
FIG. 5 is a circuit block diagram showing configuring the regulation for the turn-on phase angle and the turn-off phase angle to the bipolar solid switch unit, according to the present invention.

FIG. 5 is a circuit block diagram showing configuring the regulation for the turn-on phase angle and the turn-off phase angle to the bipolar solid switch unit, according to the present invention.

As shown in FIG. 5, it mainly consists of:

AC current limiting circuit device (Z10): which is constituted by one or more than one of resistive impedance, inductive impedance and capacitive impedance being connected in series, in parallel or in series and parallel and provided for being connected in series with the load (L101) and the bipolar solid switch unit (1000) then connected in parallel with the AC power source;

Bipolar solid switch unit (1000): which is constituted by one or more than one of following solid switch units:

1) The bipolar solid switch unit (1000) is composed of a bidirectional thyristor component capable of controlling the turn-on phase angle, e.g. bidirectional silicon controlled rectifier TRIAC (Triode AC semiconductor switch); through the configuration function of the configuration circuit of bipolar turn-on and turn-off phase angle (PD200) itself, a bipolar driving voltage signal is output to regulate the turn-on phase angle and the turn-off phase angle of the bipolar solid switch unit (1000) composed of the TRIAC, through the zener diodes (ZD101), (ZD102) which are reverse-polarity connected in series;

2) The bipolar solid switch unit (1000) is composed of at least two field effect power components, e.g. a bipolar module compose of the metal oxide semiconductor field effect transistor (MOSFET) or the integrated gate bipolar transistor (IGBT); and through the configuration function of the configuration circuit of bipolar turn-on and turn-off phase angle (PD200) itself, a bipolar driving voltage signal is output to regulate the turn-on phase angle and the turn-off phase angle of the bipolar solid switch unit (1000) composed of at least two field effect power components, through the zener diodes (ZD101), (ZD102) which are reverse-polarity connected in series;

Configuration circuit of bipolar turn-on and turn-off phase angle (PD200): which is constituted by electronic circuit components for inputting the AC power voltage; and through the configuration function of the circuit itself, a bipolar driving voltage signal is output to regulate the turn-on phase angle and the turn-off phase angle of the bipolar solid switch unit (1000) through the zener diodes (ZD101), (ZD102) which are reverse-polarity connected in series;

Zener diode (ZD101), (ZD102): which is constituted by at least two zener diodes, reverse-polarity connected in series for generating the bipolar voltage differentiation, and is provided for being connected in series between a bipolar driving voltage signal output terminal of the regulation circuit of bipolar turn-on and turn-off phase angle (PD100) and a bipolar driving voltage signal input terminal of the bipolar solid switch unit (1000); the zener diode (ZD101), (ZD102) can be replaced by a bidirectional zener diode having the same performance;

The mentioned circuit is for regulating the resistance, the inductive load containing the resistance or the capacitive load containing the resistance driven by the AC power, or the load in which the inductive load and the capacitive load containing the resistance connected in series.

Figure 6:
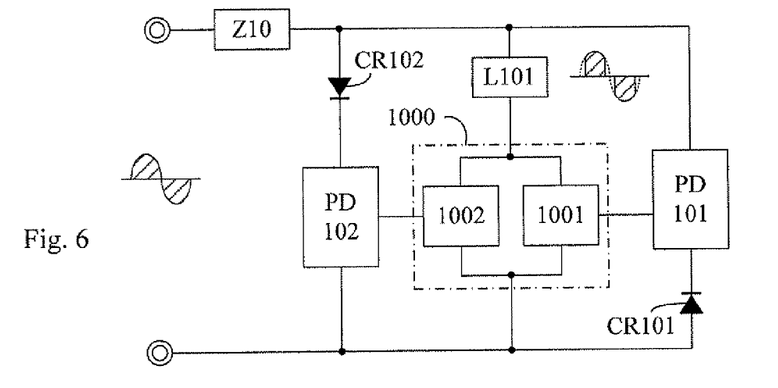
FIG. 6 is a circuit block diagram showing utilizing two bipolar solid switch units for structuring the synchronous regulation for turn-on and turn-off phase angles of the AC voltage, according to the present invention.

FIG. 6 is a circuit block diagram showing utilizing two bipolar solid switch units for structuring the synchronous regulation for turn-on and turn-off phase angles of the AC voltage, according to the present invention.

As shown in FIG. 6, it mainly consists of:

AC current limiting circuit device (Z10): which is constituted by one or more than one of resistive impedance, inductive impedance and capacitive impedance being connected in series, in parallel or in series and parallel and provided for being connected in series with the load (L101) and the bipolar solid switch unit (1000) then connected in parallel with the AC power source;

Bipolar solid switch unit (1000): which is constituted by a unipolar solid switch unit (1001) and a unipolar solid switch unit (1002) being reverse-polarity connected in parallel; the unipolar solid switch unit (1001) and the unipolar solid switch unit (1002) are composed of one or more than one of following solid switch units:

1) Constituted by at least two unipolar solid switch units (1001, 1002) capable of controlling the turn-on phase angle, e.g. at least two silicon controlled rectifiers (SCRs) being reverse-polarity connected in parallel for forming the bipolar solid switch unit (1000); and through the regulation functions of the regulation circuit of unipolar turn-on and turn-off phase angle (PD101) itself and the regulation circuit of unipolar turn-on and turn-off phase angle (PD102) itself, the driving voltage signals having different polarities are respectively output to control the turn-on phase angle and the turn-off phase angle of the unipolar solid switch unit (1001) and the unipolar solid switch unit (1002);

2) the unipolar solid switch unit (1001) and the unipolar solid switch unit (1002) are composed of at least two field effect power components being reverse-polarity connected in parallel to form the bipolar solid switch unit (1000), e.g. the bipolar module composed of the MOSFET and IGBT serving as the bipolar solid switch unit (1000); and through the regulation functions of the regulation circuit of unipolar turn-on and turn-off phase angle (PD101) itself and the regulation function of the regulation circuit of unipolar turn-on and turn-off phase angle (PD102) itself, the driving voltage signals having different polarities are respectively output to control the turn-on phase angle and the turn-off phase angle of the two field effect power components which are connected in parallel and in different polarities for respectively forming the unipolar solid switch unit (1001) and the unipolar solid switch unit (1002);

Regulation circuit of unipolar turn-on and turn-off phase angle (PD101): which is constituted by electronic circuit components and normal-polarity connected in series with the diode (CR101) for inputting an AC voltage of a first polarity; and through the regulation function of the circuit itself and with respect to the current value passing the AC current limiting circuit device (Z10) and the terminal voltage of the load (L101), a driving voltage signal having the same polarity as the unipolar solid switch unit (1001) is output to control the turn-on phase angle and the turn-off phase angle of the unipolar solid switch unit (1001);

Configuration circuit of unipolar turn-on and turn-off phase angle (PD102): which is constituted by electronic circuit components and normal-polarity connected in series with the diode (CR102) for inputting an AC voltage of a second polarity; and through the regulation function of the circuit itself and with respect to the current value passing the AC current limiting circuit device (Z10) and the terminal voltage of the load (L101), a driving voltage signal having the same polarity as the unipolar solid switch unit (1002) is output to control the turn-on phase angle and the turn-off phase angle of the unipolar solid switch unit (1002);

Diode (CR101): which is constituted by the rectifying diode, and the diode (CR101) and the unipolar solid switch unit (1001) are normal-polarity connected in series with the regulation circuit of unipolar turn-on and turn-off phase angle (PD101);

Diode (CR102): which is constituted by the rectifying diode, and the diode (CR102) and the unipolar solid switch unit (1002) are normal-polarity connected in series with the configuration circuit of unipolar turn-on and turn-off phase angle (PD102);

The mentioned circuit is for regulating the resistance, the inductive load containing the resistance or the capacitive load containing the resistance driven by the AC power, or the load in which the inductive load and the capacitive load containing the resistance connected in series.

Figure 7:
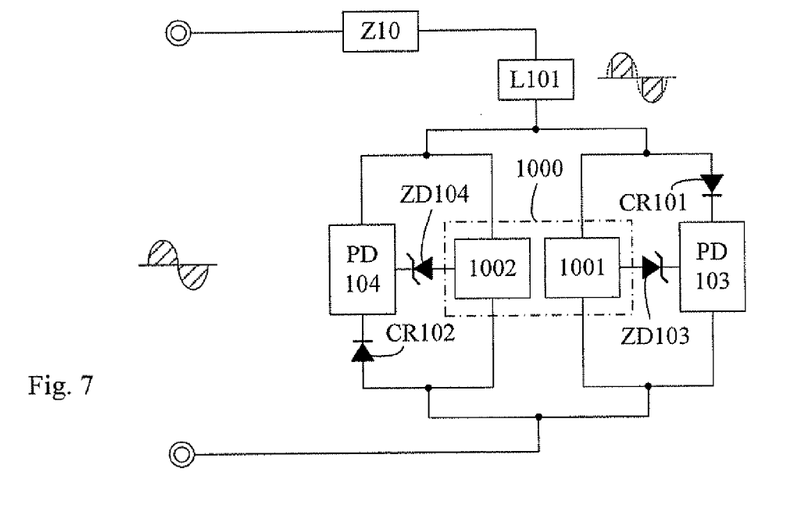
FIG. 7 is a circuit block diagram showing configuring the regulation for the turn-on and the turn-off phase angles to two solid switch units, according to the present invention.

FIG. 7 is a circuit block diagram showing configuring the regulation for the turn-on and the turn-off phase angles to two solid switch units, according to the present invention.

As shown in FIG. 7, it mainly consists of:

AC current limiting circuit device (Z10): which is constituted by one or more than one of resistive impedance, inductive impedance and capacitive impedance being connected in series, in parallel or in series and parallel and provided for being connected in series with the load (L101) and the bipolar solid switch unit (1000) then connected in parallel with the AC power source;

Bipolar solid switch unit (1000): which is constituted by a unipolar solid switch unit (1001) and a unipolar solid switch unit (1002) being reverse-polarity connected in parallel; the unipolar solid switch unit (1001) and the unipolar solid switch unit (1002) are composed of one or more than one of following solid switch units:

1) Constituted by at least two unipolar solid switch units (1001, 1002) capable of controlling the turn-on phase angle, e.g. at least two silicon controlled rectifiers (SCRs) being reverse-polarity connected in parallel for forming the bipolar solid switch unit (1000); and through the configuration functions of the configuration circuit of single-polarity turn-on and turn-off phase angle (PD103) itself and the configuration circuit of single-polarity turn-on and turn-off phase angle (PD104) itself, the driving voltage signals having different polarities are respectively output, through the zener diode (ZD103) and the zener diode (ZD104), to the unipolar solid switch unit (1001) and unipolar solid switch unit (1002) for respectively controlling the turn-on phase angle and the turn-off phase angle of the unipolar solid switch unit (1001) and unipolar solid switch unit (1002);

2) the unipolar solid switch unit (1001) and the unipolar solid switch unit (1002) are composed of at least two field effect power components being reverse-polarity connected in parallel to form the bipolar solid switch unit (1000), e.g. the bipolar module composed of the MOSFET and IGBT serving as the bipolar solid switch unit (1000); and through the configuration functions of the configuration circuit of single-polarity turn-on and turn-off phase angle (PD103) itself and the configuration circuit of single-polarity turn-on and turn-off phase angle (PD104) itself, the driving voltage signals having different polarities are respectively output, through the zener diode (ZD103) and the zener diode (ZD104), to the unipolar solid switch unit (1001) and the unipolar solid switch unit (1002) for respectively controlling the turn-on phase angle and the turn-off phase angle of the two field effect power components which are connected in parallel and in different polarities;

Configuration circuit of unipolar turn-on and turn-off phase angle (PD103): which is constituted by electronic circuit components and normal-polarity connected in series with the diode (CR101) for inputting an AC voltage of a first polarity; and through the configuration function of the circuit itself, a driving voltage signal having the same polarity as the unipolar solid switch unit (1001) is output to control the turn-on phase angle and the turn-off phase angle of the unipolar solid switch unit (1001);

Configuration circuit of unipolar turn-on and turn-off phase angle (PD104): which is constituted by electronic circuit components and normal-polarity connected in series with the diode (CR102) for inputting an AC voltage of a second polarity; and through the configuration function of the circuit itself, a driving voltage signal having the same polarity as the unipolar solid switch unit (1002) is output to control the turn-on phase angle and the turn-off phase angle of the unipolar solid switch unit (1002);

Diode (CR101): which is constituted by the rectifying diode, and the diode (CR101) and the unipolar solid switch unit (1001) are normal-polarity connected in series with the regulation circuit of unipolar turn-on and turn-off phase angle (PD101);

Diode (CR102): which is constituted by the rectifying diode, and the diode (CR102) and the unipolar solid switch unit (1002) are normal-polarity connected in series with the configuration circuit of unipolar turn-on and turn-off phase angle (PD102);

Zener diode (ZD103): which is constituted by the zener diode having zener voltage effect or the forward bias diode for being connected in series between a driving voltage signal output terminal of the configuration circuit of unipolar turn-on and turn-off phase angle (PD103) and a driving voltage signal input terminal of the unipolar solid switch unit (1001);

Zener diode (ZD104): which is constituted by the zener diode having zener voltage effect or the forward bias diode for being connected in series between a driving voltage signal output terminal of the configuration circuit of unipolar turn-on and turn-off phase angle (PD104) and a driving voltage signal input terminal of the unipolar solid switch unit (1002);

The mentioned circuit is for regulating the resistance, the inductive load containing the resistance or the capacitive load containing the resistance driven by the AC power, or the load in which the inductive load and the capacitive load containing the resistance connected in series.

Figure 8:
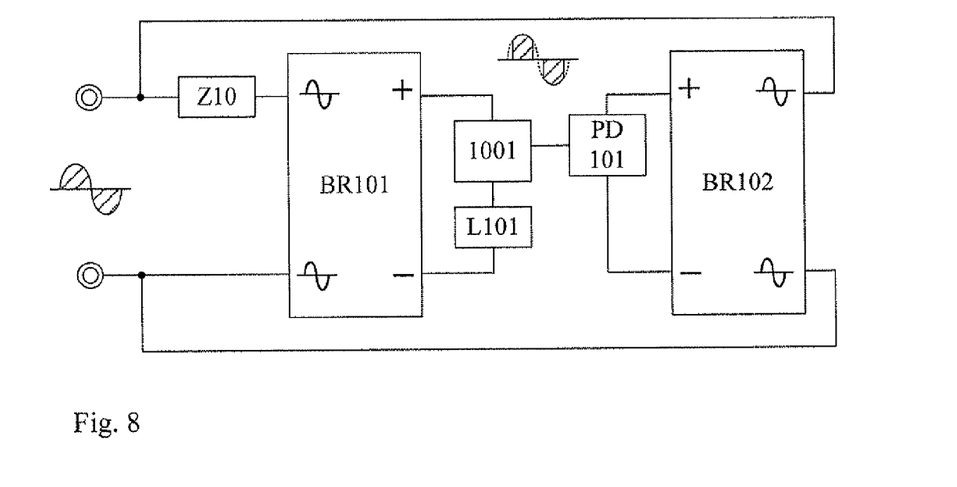
FIG. 8 is a circuit block diagram showing utilizing the bridge rectifiers combining with the solid switch unit for structuring the synchronous regulation circuit for turn-on and turn-off phase angle of the AC voltage.

FIG. 8 is a circuit block diagram showing utilizing the bridge rectifiers combining with the solid switch unit for structuring the synchronous regulation circuit for turn-on and turn-off phase angle of the AC voltage.

As shown in FIG. 8, it mainly consists of:

AC current limiting circuit device (Z10): which is constituted by one or more than one of resistive impedance, inductive impedance and capacitive impedance being connected in series, in parallel or in series and parallel and provided for being connected in series between the AC power source and an AC input terminal of the bridge rectifier (BR101);

Unipolar solid switch unit (1001): which is constituted by one or more than one of following solid switch units:

1) Constituted by the unipolar solid switch unit (1001) capable of controlling the turn-on phase angle, e.g. silicon controlled rectifier (SCR); and through the regulation function of the regulation circuit of unipolar turn-on and turn-off phase angle (PD101) itself, a driving voltage signal is output to control the turn-on phase angle and the turn-off phase angle of the unipolar solid switch unit (1001) composed of silicon controlled rectifier (SCR);

2) the field effect power component serving as the unipolar solid switch unit (1001), e.g. MOSFET and IGBT; and through the regulation function of the regulation circuit of unipolar turn-on and turn-off phase angle (PD101), a driving voltage signal is output to regulate the turn-on phase angle and the turn-off phase angle of the unipolar solid switch unit (1001) composed of the field effect power component;

Regulation circuit of unipolar turn-on and turn-off phase angle (PD101): which is constituted by electronic circuit components and provided for being connected in parallel to a DC output terminal of the bridge rectifier (BR102); and through the regulation function of the circuit itself and with respect to the current value passing the AC current limiting circuit device (Z10) and the terminal voltage of the load (L101), a driving voltage signal having the same polarity as the unipolar solid switch unit (1001) is output to control the turn-on phase angle and the turn-off phase angle of the unipolar solid switch unit (1001);

Bridge rectifier (BR101): which is constituted by at least four rectifying diodes, in which the AC power input terminal is provided for being connected in series to the AC current limiting circuit device (Z10) so as to be connected to the AC power source, and is provided with the output terminals having anode and cathode of the DC power source; for rectifying the AC power source to DC power source, so as to output to the unipolar solid switch unit (1001) and the load (L101) connected in series;

Bridge rectifier (BR102): which is constituted by at least four rectifying diodes and provided with two input terminals for receiving the AC power source and the output terminals having anode and cathode for outputting the DC power source; for rectifying the AC power source to DC power source, so as to output to the regulation circuit of unipolar turn-on and turn-off phase angle (PD101) then further output the driving voltage signal to the unipolar solid switch unit (1001);

The mentioned circuit is for regulating the resistance, the inductive load containing the resistance or the capacitive load containing the resistance driven by the AC power, or the load in which the inductive load and the capacitive load containing the resistance connected in series.

Figure 9:
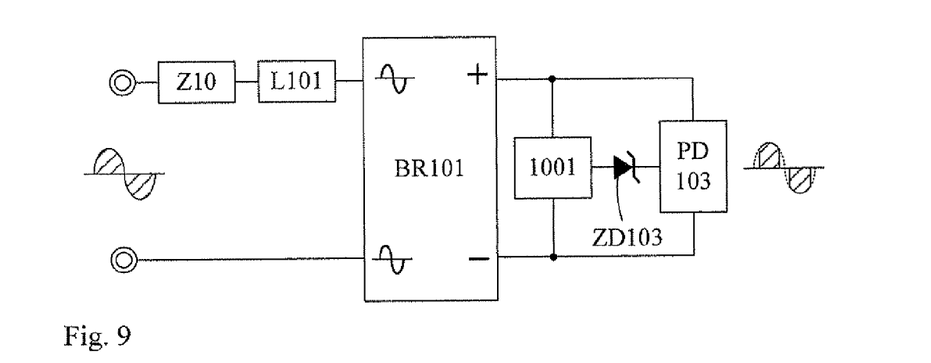
FIG. 9 is a circuit block diagram showing configuring the regulation for the turn-on and turn-off phase angles to the solid switch unit combined with the bridge rectifiers, according to the present invention.

FIG. 9 is a circuit block diagram showing configuring the regulation for the turn-on and turn-off phase angles to the solid switch unit combined with the bridge rectifiers, according to the present invention.

As shown in FIG. 9, it mainly consists of:

AC current limiting circuit device (Z10): which is constituted by one or more than one of resistive impedance, inductive impedance and capacitive impedance being connected in series, in parallel or in series and parallel, and one terminal thereof is connected to one terminal of the AC power source, and the other terminal thereof is connected in series with the load (L101) for leading to the AC input terminal of the bridge rectifier (BR101), and the other AC input terminal of the bridge rectifier (BR101) is connected to the other terminal of the AC power source;

Unipolar solid switch unit (1001): which is constituted by one or more than one of following solid switch units:

1) Constituted by the unipolar solid switch unit (1001) capable of controlling the turn-on phase angle, e.g. silicon controlled rectifier (SCR); and through the regulation function of the regulation circuit of unipolar turn-on and turn-off phase angle (PD101) itself and with respect to the current value passing the AC current limiting circuit device (Z10) and the terminal voltage value of the load (L101), a driving voltage signal is output, through the zener diode (ZD103), to control the turn-on phase angle and the turn-off phase angle of the unipolar solid switch unit (1001) composed of silicon controlled rectifier (SCR);

2) the field effect power component serving as the unipolar solid switch unit (1001), e.g. MOSFET and IGBT; and through the regulation function of the regulation circuit of unipolar turn-on and turn-off phase angle (PD101) and with respect to the current value passing the AC current limiting circuit device (Z10) and the terminal voltage value of the load (L101), a driving voltage signal is output, through the zener diode (ZD103), to regulate the turn-on phase angle and the turn-off phase angle of the unipolar solid switch unit (1001) composed of the field effect power component;

Configuration circuit of unipolar turn-on and turn-off phase angle (PD103): constituted by electronic circuit components and provided for being connected in parallel to the DC output terminal of the bridge rectifier (BR101); through the configuration function of the circuit itself, a driving voltage signal is output, and through the zener diode (ZD103), to control the turn-on phase angle and the turn-off phase angle of the unipolar solid switch unit (1001);

Bridge rectifier (BR101): which is constituted by at least four rectifying diodes and provided with two input terminals for receiving the AC power source and the output terminals having anode and cathode for outputting the DC power source; for rectifying the AC power source to DC power source, so as to output to the unipolar switch unit (1001) and the configuration circuit of single-polarity turn-on and turn-off phase angle (PD103);

Zener diode (ZD103): which is constituted by the zener diode having zener voltage effect or the forward bias diode for being connected in series between a driving voltage signal output terminal of the configuration circuit of unipolar turn-on and turn-off phase angle (PD103) and a driving voltage signal input terminal of the unipolar solid switch unit (1001);

The mentioned circuit is for regulating the resistance, the inductive load containing the resistance or the capacitive load containing the resistance driven by the AC power, or the load in which the inductive load and the capacitive load containing the resistance connected in series.

Figure 10:
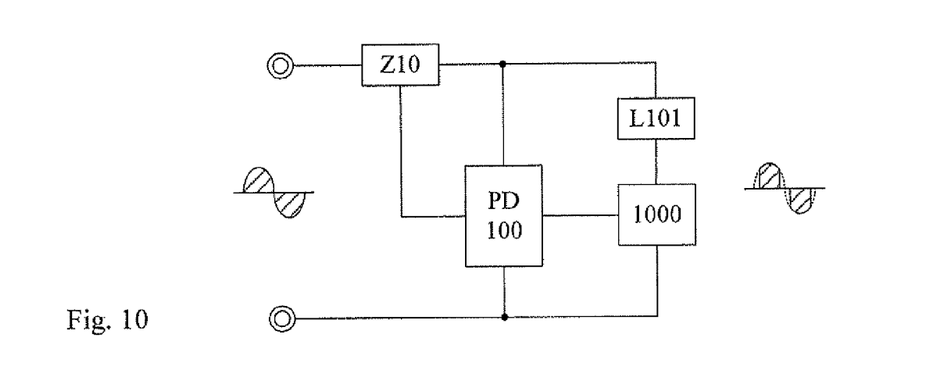
FIG. 10 is a circuit block diagram showing utilizing the bipolar solid switch unit to structure the synchronous regulation for turn-on and turn-off phase angle of the AC voltage, and through the AC current limiting circuit device (Z10) detecting the current value, to output to the regulation circuit of turn-on and turn-off phase angle, thereby to regulate the voltage or current passing the load via the solid switch unit.

FIG. 10 is a circuit block diagram showing utilizing the bipolar solid switch unit to structure the synchronous regulation for turn-on and turn-off phase angle of the AC voltage, and through the AC current limiting circuit device (Z10) detecting the current value, to output to the regulation circuit of turn-on and turn-off phase angle, thereby to regulate the voltage or current passing the load via the solid switch unit.

As shown in FIG. 10, it mainly consists of:

AC current limiting circuit device (Z10): which is constituted by one or more than one of resistive impedance, inductive impedance and capacitive impedance being connected in series, in parallel or in series and parallel and provided for being connected in series with the load (L101) and the bipolar solid switch unit (1000) then connected in parallel with the AC power source;

Bipolar solid switch unit (1000): which is constituted by one or more than one of following solid switch units:

1) The bipolar solid switch unit (1000) is composed of a bidirectional thyristor component capable of controlling the turn-on phase angle, e.g. bidirectional silicon controlled rectifier TRIAC (Triode AC semiconductor switch); through the regulation function of the regulation circuit of bipolar turn-on and turn-off phase angle (PD100) itself and with respect to the current value passing the AC current limiting circuit device (Z10) and the terminal voltage of the load (L101), a bipolar driving voltage signal is output to regulate the turn-on phase angle and the turn-off phase angle of the bipolar solid switch unit (1000) composed of the TRIAC;

2) The bipolar solid switch unit (1000) is composed of at least two field effect power components, e.g. a bipolar module composed of the metal oxide semiconductor field effect transistor (MOSFET) or the insulated gate bipolar transistor (IGBT) bipolar solid switch unit; and through the regulation function of the regulation circuit of bipolar turn-on and turn-off phase angle (PD100) itself and with respect to the current value passing the AC current limiting circuit device (Z10) and the terminal voltage of the load (L101), a bipolar driving voltage signal is output to regulate the turn-on phase angle and the turn-off phase angle of the bipolar solid switch unit (1000) composed of at least two field effect power components;

Regulation circuit of bipolar turn-on and turn-off phase angle (PD100): which is constituted by electronic circuit components for inputting the AC power voltage; and through the regulation function of the circuit itself, and with respect to the current value passing the AC current limiting circuit device (Z10) and the terminal voltage value of the load (L101), a bipolar driving voltage signal is output to regulate the turn-on phase angle and the turn-off phase angle of the bipolar solid switch unit (1000);

The mentioned circuit is for regulating the resistance, the inductive load containing the resistance or the capacitive load containing the resistance driven by the AC power, or the load in which the inductive load and the capacitive load containing the resistance connected in series.

Figure 11:
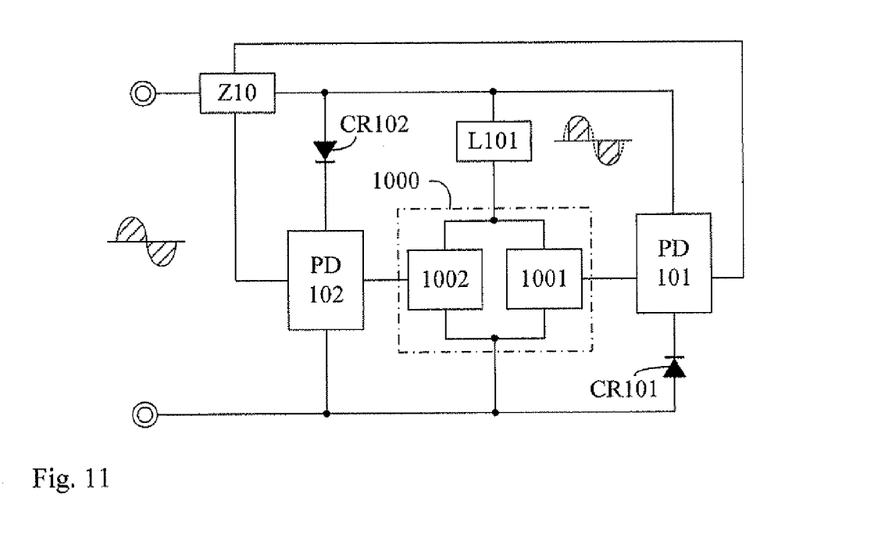
FIG. 11 is a circuit block diagram showing utilizing two solid switch units to structure the synchronous regulation for turn-on and turn-off phase angle of the AC voltage, and through the AC current limiting circuit device (Z10) detecting the current value, to output to the regulation circuit of turn-on and turn-off phase angle, thereby to regulate the voltage or current passing the load via the solid switch unit.

FIG. 11 is a circuit block diagram showing utilizing two solid switch units to structure the synchronous regulation for turn-on and turn-off phase angle of the AC voltage, and through the AC current limiting circuit device (Z10) detecting the current value, to output to the regulation circuit of turn-on and turn-off phase angle, thereby to regulate the voltage or current passing the load via the solid switch unit.

As shown in FIG. 11, it mainly consists of:

AC current limiting circuit device (Z10): which is constituted by one or more than one of resistive impedance, inductive impedance and capacitive impedance being connected in series, in parallel or in series and parallel and provided for being connected in series with the load (L101) and the bipolar solid switch unit (1000) then connected in parallel with the AC power source;

Bipolar solid switch unit (1000): which is constituted by a unipolar solid switch unit (1001) and a unipolar solid switch unit (1002) being reverse-polarity connected in parallel; the unipolar solid switch unit (1001) and the unipolar solid switch unit (1002) are composed of one or more than one of following solid switch units:

1) Constituted by at least two unipolar solid switch units (1001, 1002) capable of controlling the turn-on phase angle, e.g. at least two silicon controlled rectifiers (SCRs) being reverse-polarity connected in parallel for forming the bipolar solid switch unit (1000); and through the regulation functions of the regulation circuit of unipolar turn-on and turn-off phase angle (PD101) itself and the regulation circuit of unipolar turn-on and turn-off phase angle (PD102) itself and with respect to the current value passing the AC current limiting circuit device (Z10) and the terminal voltage value of the load (L101), the driving voltage signals having different polarities are respectively output to control the turn-on phase angle and the turn-off phase angle of the unipolar solid switch unit (1001) and the unipolar solid switch unit (1002);

2) the unipolar solid switch unit (1001) and the unipolar solid switch unit (1002) are composed of at least two field effect power components being reverse-polarity connected in parallel to form the bipolar solid switch unit (1000), e.g. the bipolar module composed of the MOSFET and IGBT serving as the bipolar solid switch unit (1000); and through the regulation functions of the regulation circuit of unipolar turn-on and turn-off phase angle (PD101) itself and the regulation circuit of unipolar turn-on and turn-off phase angle (PD102) itself and with respect to the current value passing the AC current limiting circuit device (Z10) and the terminal voltage value of the load (L101), the driving voltage signals having different polarities are respectively output to control the turn-on phase angle and the turn-off phase angle of the two field effect power components which are connected in parallel and in different polarities for respectively forming the unipolar solid switch unit (1001) and the unipolar solid switch unit (1002);

Regulation circuit of unipolar turn-on and turn-off phase angle (PD101): which is constituted by electronic circuit components and normal-polarity connected in series with the diode (CR101) for inputting an AC voltage of a first polarity; and through the regulation function of the circuit itself and with respect to the current value passing the AC current limiting circuit device (Z10) and the terminal voltage of the load (L101), a driving voltage signal having the same polarity as the unipolar solid switch unit (1001) is output to control the turn-on phase angle and the turn-off phase angle of the unipolar solid switch unit (1001);

Configuration circuit of unipolar turn-on and turn-off phase angle (PD102): which is constituted by electronic circuit components and normal-polarity connected in series with the diode (CR102) for inputting an AC voltage of a second polarity; and through the regulation function of the circuit itself and with respect to the current value passing the AC current limiting circuit device (Z10) and the terminal voltage of the load (L101), a driving voltage signal having the same polarity as the unipolar solid switch unit (1002) is output to control the turn-on phase angle and the turn-off phase angle of the unipolar solid switch unit (1002);

Diode (CR101): which is constituted by the rectifying diode, and the diode (CR101) and the unipolar solid switch unit (1001) are normal-polarity connected in series with the regulation circuit of unipolar turn-on and turn-off phase angle (PD101);

Diode (CR102): which is constituted by the rectifying diode, and the diode (CR102) and the unipolar solid switch unit (1002) are normal-polarity connected in series with the configuration circuit of unipolar turn-on and turn-off phase angle (PD102);

The mentioned circuit is for regulating the resistance, the inductive load containing the resistance or the capacitive load containing the resistance driven by the AC power, or the load in which the inductive load and the capacitive load containing the resistance connected in series.

Figure 12:
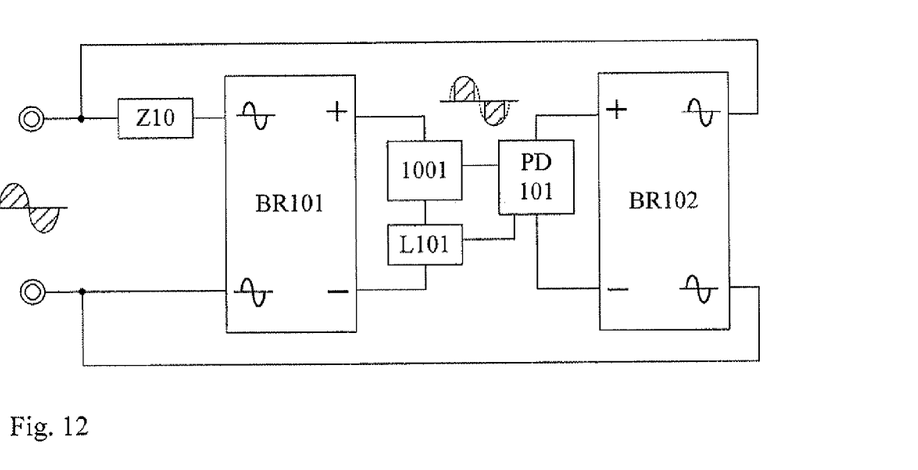
FIG. 12 is a circuit block diagram showing utilizing the bridge rectifiers combining with the solid switch unit to structure the synchronous regulation for turn-on and turn-off phase angle of the AC voltage, and through the AC current limiting circuit device (Z10) detecting the current value, to output to the regulation circuit of turn-on and turn-off phase angle, and to regulate the voltage or current passing through the load via the solid switch unit.

FIG. 12 is a circuit block diagram showing utilizing the bridge rectifiers combining with the solid switch unit to structure the synchronous regulation for turn-on and turn-off phase angle of the AC voltage, and through the AC current limiting circuit device (Z10) detecting the current value, to output to the regulation circuit of turn-on and turn-off phase angle, and to regulate the voltage or current passing through the load via the solid switch unit.

As shown in FIG. 12, it mainly consists of:

AC current limiting circuit device (Z10): which is constituted by one or more than one of resistive impedance, inductive impedance and capacitive impedance being connected in series, in parallel or in series and parallel and provided for being connected in series between the AC power source and an AC input terminal of the bridge rectifier (BR101);

Unipolar solid switch unit (1001): which is constituted by one or more than one of following solid switch units:

1) Constituted by the unipolar solid switch unit (1001) capable of controlling the turn-on phase angle, e.g. silicon controlled rectifier (SCR); and through the regulation function of the regulation circuit of unipolar turn-on and turn-off phase angle (PD101) itself and with respect to the current value passing the AC current limiting circuit device (Z10) and the terminal voltage value of the load (L101), a driving voltage signal is output to control the turn-on phase angle and the turn-off phase angle of the unipolar solid switch unit (1001) composed of silicon controlled rectifier (SCR);

2) the field effect power component serving as the unipolar solid switch unit (1001), e.g. MOSFET and IGBT; and through the regulation function of the regulation circuit of unipolar turn-on and turn-off phase angle (PD101) itself and with respect to the current value passing the AC current limiting circuit device (Z10) and the terminal voltage value of the load (L101), a driving voltage signal is output to regulate the turn-on phase angle and the turn-off phase angle of the unipolar solid switch unit (1001) composed of the field effect power component;

Regulation circuit of unipolar turn-on and turn-off phase angle (PD101): which is constituted by electronic circuit components, and connected in parallel to a DC output terminal of the bridge rectifier (BR102); and through the regulation function of the circuit itself and with respect to the current value passing the AC current limiting circuit device (Z10) and the terminal voltage of the load (L101), a driving voltage signal having the same polarity as the unipolar solid switch unit (1001) is output to control the turn-on phase angle and the turn-off phase angle of the unipolar solid switch unit (1001);

Bridge rectifier (BR101): which is constituted by at least four rectifying diodes, in which the AC power input terminal is provided for being connected in series to the AC current limiting circuit device (Z10) so as to be connected to the AC power source, and is provided with the output terminals having anode and cathode of the DC power source; for rectifying the AC power source to DC power source, so as to output to the unipolar solid switch unit (1001) and the load (L101) connected in series;

Bridge rectifier (BR102): which is constituted by at least four rectifying diodes and provided with two input terminals for receiving the AC power source and the output terminals having anode and cathode for outputting the DC power source; for rectifying the AC power source to DC power source, so as to output to the regulation circuit of unipolar turn-on and turn-off phase angle (PD101) then further output the driving voltage signal to the unipolar solid switch unit (1001);

The mentioned circuit is for regulating the resistance, the inductive load containing the resistance or the capacitive load containing the resistance driven by the AC power, or the load in which the inductive load and the capacitive load containing the resistance connected in series.

According to the synchronous regulation circuit for turn-on and turn-off phase angle of the AC voltage provided by the present invention, the output driving voltage signal of the regulation circuit of bipolar turn-on and turn-off phase angle (PD100), the configuration circuit of bipolar turn-on and turn-off phase angle (PD200), the regulation circuit of unipolar turn-on and turn-off phase angle (PD101) and (PD102), the configuration circuit of unipolar turn-on and turn-off phase angle (PD103) and (PD104) can be constituted by the followings, which includes:

1) Directly outputting the power signal to drive the mated solid switch unit;

2) Utilizing a photoelectric coupling device for insulation and outputting the power signal to drive the mated solid switch unit; and 3) Utilizing a pulse transformer for insulation and outputting the power signal to drive the mated solid switch unit.

The invention claimed is:

1. A synchronous regulation circuit, wherein a bipolar solid switch unit is installed between a single-phase or multiphase AC power source and a load, and a phase angle regulation circuit is utilized to synchronously regulate both a turn-on phase angle and a turn-off phase angle of the bipolar solid switch unit, so that a sine waveform voltage of the AC power source is kept as a symmetrical waveforms within a range in which the phase angle turn-on and turn-off devices are synchronously regulated to regulate a voltage output of the single-phase or multiphase AC power source for supplying power with a stable voltage to a load or for regulating an output current to the load, and wherein one of (a) a bidirectional zener diode, or (b) zener diodes (ZD101 and ZD102) that are reverse polarity connected in series, are connected between a bipolar driving voltage signal output terminal of the configuration circuit and a bipolar driving voltage signal input terminal of the bipolar solid switch unit (1000), the synchronous regulation circuit comprising:

an AC current limiting circuit device (Z10): which is constituted by one or more than one of a resistive impedance, an inductive impedance and a capacitive impedance connected in series, in parallel, or in series and parallel, the AC current limiting circuit device (Z10) being connected in series with the load (L101) and the bipolar solid switch unit (1000), and the series-connected AC current limiting circuit device (Z10), load (L101), and bipolar solid switch unit (1000) being connected in parallel with the AC power source;

the bipolar solid switch unit (1000): which is constituted by one or more than one of following solid switch units:

1) a bidirectional thyristor component capable of controlling the turn-on phase angle; wherein through configuration by a configuration circuit-of a bipolar phase angle turn-on and turn-off device (PD200), a bipolar driving voltage signal is output to regulate the turn-on phase angle and the turn-off phase angle of the bipolar solid switch unit (1000); and 2) at least two field effect power components; wherein through configuration by a configuration circuit-of the bipolar phase angle turn-on and turn-off device (PD200), the bipolar driving voltage signal is output to regulate the turn-on phase angle and the turn-off phase angle of the bipolar solid switch unit (1000);

the configuration circuit of the bipolar phase angle turn-on and turn-off device (PD200); which is constituted by electronic circuit components for inputting the AC voltage; wherein the configuration circuit, with respect to a current value passing the AC current limiting circuit device (Z10) and a terminal voltage value of a load (L101), outputs the bipolar driving voltage signal through the zener diodes (ZD101 and ZD102) to regulate the turn-on phase angle and the turn-off phase angle of the bipolar solid switch unit (1000); and the zener diodes (ZD101 and ZD102) connected in reverse polarity series between the configuration circuit of the bipolar phase angle turn-on and turn-off device (PD200) and the bipolar solid switch unit (1000), wherein the synchronous regulation circuit is for regulating a resistance, an inductive load containing the resistance, or a capacitive load containing the resistance and driven by AC power, or load in which the inductive load and the capacitive load containing the resistance are connected in series.

2. A synchronous regulation circuit as claimed in claim 1, wherein the bipolar solid switch unit (1000) is constituted by a bidirectional silicon controlled rectifier TRIAC (triode AC semiconductor switch).

3. A synchronous regulation circuit as claimed in claim 1, wherein the bipolar solid switch unit (1000) is constituted by the at least two field effect power components, each constituted by a bipolar module composed of the metal oxide semiconductor field effect transistor (MOSFET) or the insulated gate bipolar transistor (IGBT).

4. A synchronous regulation circuit as claimed in claim 1, wherein the AC current limiting circuit device (Z10) is further connected to detect a current value output by the AC power source and to output the current value to the regulation circuit of the bipolar solid switch unit (1000).

5. A synchronous regulation circuit as claimed in claim 1, wherein the configuration circuit of the bipolar phase angle turn-on and turn-off device (PD200) regulates driving of the bipolar solid switch unit (1000) by one of the following:

a. directly outputting a power signal to drive the bipolar solid switch unit (1000);

b. utilizing a photoelectric coupling device for insulation and output the power signal to drive the bipolar solid switch unit (1000); and c. utilizing a pulse transformer for insulation and outputting the power signal to drive the bipolar solid switch unit (1000).

6. A synchronous regulation circuit, wherein a bipolar solid switch unit is installed between a single-phase or multiphase AC power source and a load, and a phase angle regulation circuit is utilized to synchronously regulate both a turn-on phase angle and a turn-off phase angle of the bipolar solid switch unit, so that a sine waveform voltage of the AC power source is kept as a symmetrical waveforms within a range in which the phase angle turn-on and turn-off devices are synchronously regulated to regulate a voltage output of the single-phase or multiphase AC power source for supplying power with a stable voltage to a load or for regulating an output current to the load, comprising:

an AC current limiting circuit device (Z10): which is constituted by one or more than one of a resistive impedance, an inductive impedance and a capacitive impedance connected in series, in parallel, or in series and parallel, the AC current limiting circuit device (Z10) being connected in series with the load (L101) and the bipolar solid switch unit (1000);

the bipolar solid switch unit (1000): which is constituted by a first unipolar solid switch unit (1001) and a second unipolar solid switch unit (1002) reverse-polarity connected in parallel, the parallel-connected unipolar switch units (1001,1002) being constituted by one or more than one of following solid switch units (1001, 1002):

1) at least two silicon controlled rectifiers (SCRs) reverse-polarity connected in parallel; wherein through regulation by first and second regulation circuits of unipolar phase angle turn-on and turn-off devices (PD 101 and PD 102), first and second driving voltage signals having different polarities are respectively output to regulate the turn-on phase angles and the turn-off phase angles of the SCRs that make up the first and second unipolar solid switch units (1001, 1002);

2) at least two field effect power components reverse-connected in parallel; wherein through the regulation by the regulation circuit of the unipolar phase angle turn-on and turn-off devices (PD101 and PD 102), the first and second driving voltage signals having different polarities are respectively output to regulate the turn-on phase angles and the turn-off phase angles of the at least two field effect power components that make up the first and second unipolar solid switch units (1001,1002);

the first regulation circuit of the unipolar phase angle turn-on and turn-off device (PD 101): which is constituted by electronic circuit components normal-polarity connected in series with a first rectifying diode (CR101) for inputting an AC voltage of a first polarity;

wherein the first regulation circuit, with respect to a current value passing the AC current limiting circuit device (Z10) and a terminal voltage value of the load (L101), outputs the first bipolar driving voltage signal to regulate the turn-on phase angle and the turn-off phase angle of the first unipolar solid switch unit (1001); and the second regulation circuit of the unipolar phase angle turn-on and turn-off device (PD102): which is a configuration circuit constituted by electronic circuit components normal-polarity connected in series with a second rectifying diode (CR102) for inputting an AC voltage of a second polarity; wherein the second regulation circuit, with respect to the current value passing the AC current limiting circuit device (Z10) and the terminal voltage value of the load (L101), outputs the second bipolar driving voltage signal to regulate the turn-on phase angle and the turn-off phase angle of the second unipolar solid switch unit (1002), and wherein the synchronous regulation circuit is for regulating a resistance, an inductive load containing the resistance, or a capacitive load containing the resistance and driven by AC power, or load in which the inductive load and the capacitive load containing the resistance are connected in series.

7. A synchronous regulation circuit as claimed in claim 6, further comprising a first zener diode (ZD103) and a second zener diode (ZD104) that are reverse polarity connected in series, wherein:

the first regulation circuit of the first unipolar solid switch unit (1001) is a configuration circuit, and the first zener diode (ZD103) is connected in series between a driving voltage signal output terminal of the configuration circuit of the first unipolar phase angle turn-on and turn-off device (PD 103) and a driving voltage signal input terminal of the first unipolar solid switch unit (1001);

the second zener diode (ZD104) is connected in series between a driving voltage signal output terminal of the configuration circuit of the second unipolar phase angle turn-on and turn- off device (PD104) and a driving voltage signal input terminal of the second unipolar solid switch unit (1002).

8. A synchronous regulation circuit as claimed in claim 7, wherein the first and second configuration circuits of the unipolar phase angle turn-on and turn-off devices (PD103, PD104) output the respective first and second output driving voltage signals by one of the following:

a. directly outputting a power signal to drive the respective first and second unipolar solid switch units (1001,1002);

b. utilizing a photoelectric coupling device for insulation and output the power signal to drive the respective first and second unipolar solid switch units (1001,1002); and c. utilizing a pulse transformer for insulation and outputting the power signal to drive the respective unipolar solid switch units (1001,1002).

9. A synchronous regulation circuit as claimed in claim 6, wherein the AC current limiting circuit device (Z10) is further connected to detect a current value output by the AC power source and to output the current value to the regulation circuits of the unipolar solid switch units (1001 and 1002).

10. A synchronous regulation circuit as claimed in claim 6, wherein the first and second regulation circuits of the unipolar phase angle turn-on and turn-off devices (PD101,PD102) output the respective first and second output driving voltage signals by one of the following:

a. directly outputting a power signal to drive the respective first and second unipolar solid switch units (1001,1002);

b. utilizing a photoelectric coupling device for insulation and output the power signal to drive the respective first and second unipolar solid switch units (1001,1002); and c. utilizing a pulse transformer for insulation and outputting the power signal to drive the respective unipolar solid switch units (1001,1002).

11. A synchronous regulation circuit, wherein a solid switch unit is installed between single-phase or multiphase AC power source and a load, and a phase angle regulation circuit is utilized to synchronously regulate both a turn-on phase angle and a turn-off phase angle of a unipolar solid switch unit, so that a sine waveform voltage of the AC power source is kept as a symmetrical waveforms within a range in which the phase angle turn-on and turn-off devices are synchronously regulated to regulate a voltage output of the single or multiphase AC power source for supplying power with a stable voltage to a load or for regulating an output current to the load, comprising:

an AC current limiting circuit device (Z10): which is constituted by one or more than one of a resistive impedance, an inductive impedance and a capacitive impedance connected in series, in parallel, or in series and parallel, the AC current limiting circuit device (Z10)

being connected in series between the AC power source and an AC input terminal of a first bridge rectifier (BR101);

a unipolar solid switch unit (1001): which is constituted by one or more than one of following solid switch units:
1) a silicon controlled rectifier (SCR) capable of controlling the turn-on phase angle; wherein through regulation by a regulation circuit of a unipolar phase angle turn-on and turn-off device (PD 101), a bipolar driving voltage signal is output to regulate the turn-on phase angle and the turn-off phase angle of the SCR; and
2) a field effect power component; wherein through the regulation by the regulation circuit-of the unipolar phase angle turn-on and turn-off device (PD101), the bipolar driving voltage signal is output to regulate the turn-on phase angle and the turn-off phase angle of the field effect power component;

the regulation circuit of the unipolar phase angle turn-on and turn-off device (PD101): which is constituted by electronic circuit components connected in parallel to a DC output terminal of a second bridge rectifier (BR102); wherein the regulation circuit, with respect to a current value passing the AC current limiting circuit device (Z10) and a terminal voltage value of a load (L101), outputs the bipolar driving voltage signal to regulate the turn-on phase angle and the turn-off phase angle of the unipolar solid switch unit (1001);

the first bridge circuit (BR101): which is constituted by at least four rectifying diodes, in which the AC input power terminal is connected in series to the AC current limiting circuit device (Z10) so as to be connected to the AC power source, and is provided with output terminals forming an anode and cathode of a DC power source for the unipolar solid switch unit (1001) and the load (L101) connected in series; and the second bridge circuit (BR102): which is constituted by at least four rectifying diodes, in which the AC input power terminal is connected in series to the AC current limiting circuit device (Z10) so as to be connected to the AC power source, and is provided with output terminals forming an anode and cathode of a DC power source for the regulation circuit of the unipolar phase angle turn-on and turn-off device (PD101), which outputs the driving voltage signal to the unipolar solid switch unit (1001), wherein the synchronous regulation circuit is for regulating a resistance, an inductive load containing the resistance, or a capacitive load containing the resistance and driven by AC power, or load in which the inductive load and the capacitive load containing the resistance are connected in series.

12. A synchronous regulation circuit as claimed in claim 11, wherein the regulation circuit of the unipolar phase angle turn-on and turn-off device (PD101) outputs the output driving voltage signal by one of the following:
a. directly outputting a power signal to drive the unipolar solid switch unit (1001);
b. utilizing a photoelectric coupling device for insulation and output the power signal to drive the unipolar solid switch unit (1001); and
c. utilizing a pulse transformer for insulation and outputting the power signal to drive the unipolar solid switch unit (1001).

13. A synchronous regulation circuit as claimed in claim 11, wherein the AC current limiting circuit device (Z10) is further connected to detect a current value output by the AC power source and to output the current value to the regulation circuits of the unipolar solid switch unit (1001).

14. A synchronous regulation circuit, wherein a solid switch unit is installed between single-phase or multiphase AC power source and a load, and a phase angle regulation circuit is utilized to synchronously regulate both a turn-on phase angle and a turn-off phase angle of a unipolar solid switch unit, so that a sine waveform voltage of the AC power source is kept as a symmetrical waveforms within a range in which the phase angle turn-on and turn-off devices are synchronously regulated to regulate a voltage output of the single or multiphase AC power source for supplying power with a stable voltage to a load or for regulating an output current to the load, comprising:

an AC current limiting circuit device (Z10): which is constituted by one or more than one of a resistive impedance, an inductive impedance and a capacitive impedance connected in series, in parallel, or in series and parallel, a first terminal of the AC current limiting circuit device (Z10) being connected to a first terminal of the AC power source and the load (L101) being connected in series between a second terminal of the AC current limiting circuit device (Z10) and a first AC input terminal of a bridge rectifier (BR101), a second AC input terminal of the bridge rectifier (BR101) being connected to a second terminal of the AC power source;

a unipolar solid switch unit (1001): which is constituted by one or more than one of following solid switch units:
2) a silicon controlled rectifier (SCR) capable of controlling the turn-on phase angle; wherein through regulation by a configuration circuit-of a unipolar phase angle turn-on and turn-off device (PD103), a bipolar driving voltage signal is output through a zener diode (ZD103) to regulate the turn-on phase angle and the turn-off phase angle of the SCR; and
2) a field effect power component; wherein through the regulation by the configuration circuit of the unipolar phase angle turn-on and turn-off device (PD103), the bipolar driving voltage signal is output through a zener diode (ZD103) to regulate the turn-on phase angle and the turn-off phase angle of the field effect power component;

the regulation circuit of the unipolar phase angle turn-on and turn-off device (PD101): which is constituted by electronic circuit components connected in parallel to a DC output terminal of the bridge rectifier (BR101); wherein the configuration circuit, with respect to a current value passing the AC current limiting circuit device (Z10) and a terminal voltage value of a load (L101), outputs the bipolar driving voltage signal to control the turn-on phase angle and the turn-off phase angle of the unipolar solid switch unit (1001);

the bridge circuit (BR101): which is constituted by at least four rectifying diodes and is provided with output terminals forming an anode and cathode of a DC power source for the unipolar solid switch unit (1001) and the configuration circuit of the unipolar turn-on and turn-off phase angle (PD 103); and the zener diode (ZD103): connected in series between a driving voltage signal output terminal of the configuration circuit of the unipolar phase angle turn-on and turn-off device (PD103) and a driving voltage signal input terminal of the unipolar solid switch unit (1001), wherein the synchronous regulation circuit is for regulating a resistance, an inductive load containing the resistance, or a capacitive load containing the resistance and driven by AC power, or load in which the inductive load and the capacitive load containing the resistance are connected in series.

15. A synchronous regulation circuit as claimed in claim 14, wherein the regulation circuit of the unipolar phase angle turn-on and turn-off device (PD103) outputs the output driving voltage signal by one of the following:
  a. directly outputting a power signal to drive the unipolar solid switch unit (1001);
  b. utilizing a photoelectric coupling device for insulation and output the power signal to drive the unipolar solid switch unit (1001); and
  c. utilizing a pulse transformer for insulation and outputting the power signal to drive the unipolar solid switch unit (1001).

* * * * *